United States Patent [19]

Scott et al.

[11] Patent Number: 4,757,452
[45] Date of Patent: Jul. 12, 1988

[54] JITTER MEASUREMENT METHOD AND APPARATUS

[75] Inventors: Peter M. Scott, Edinburgh; William McFarlane, Glasgow, both of Scotland

[73] Assignee: Hewlett-Packard Company, Palo Alto, Calif.

[21] Appl. No.: 859,117

[22] Filed: May 2, 1986

[30] Foreign Application Priority Data

May 8, 1985 [GB] United Kingdom ............... 8511585

[51] Int. Cl.⁴ .............................................. H04J 3/07
[52] U.S. Cl. .................................. 364/481; 370/102; 375/118; 324/83 R
[58] Field of Search ............... 364/481, 486; 370/102, 370/13; 358/160, 166, 167, 134; 324/83 R, 121 R; 328/162, 163, 155; 375/118

[56] References Cited

U.S. PATENT DOCUMENTS

| | | | |
|---|---|---|---|
| 3,737,766 | 6/1973 | Lubarsky, Jr. | 324/83 R |
| 3,830,981 | 8/1974 | Gruber et al. | 370/102 |
| 3,916,307 | 10/1975 | Hekimian | 324/83 R |
| 4,147,895 | 4/1979 | Fenoglio | 370/102 |
| 4,158,857 | 6/1979 | Hiraguri | 358/139 |
| 4,320,516 | 3/1982 | Kammerlander | 375/118 |
| 4,350,879 | 9/1982 | Feher | 328/163 |
| 4,397,017 | 8/1983 | Rokugo | 370/102 |
| 4,639,939 | 1/1987 | Hirosaki et al. | 328/162 |
| 4,654,861 | 3/1987 | Godard | 324/83 R |
| 4,667,324 | 5/1987 | Graves | 370/102 |
| 4,674,088 | 6/1987 | Grover | 370/102 |
| 4,688,215 | 8/1987 | Fryer | 370/102 |

OTHER PUBLICATIONS

"Transmission Systems for Communications", Bell Telephone Laboratories—Technical Publications, Dec. 1971, pp. 622–623.

Primary Examiner—Parshotam S. Lall
Assistant Examiner—V. N. Trans
Attorney, Agent, or Firm—James M. Williams

[57] ABSTRACT

A method and apparatus is provided for measuring the timing jitter of a tributary data stream that has been multiplexed into a higher-rate multiplex stream using pulse stuffing techniques. The required jitter measurement is carried out by monitoring the relevant stuffing control bits of the multiplex stream. In one embodiment, the apparatus comprises a first microprocessor for determining the tributary stuffing ratio from the stuffing control bits, and a second microprocessor operative to determine a current jitter signal value by using both the stuff information contained in the stuffing control bits, and the stuffing ratio determined by the first microprocessor. The second microprocessor carried out its task by updating a preceding jitter signal value by incrementing this value each time a stuff occurs while decreasing the jitter signal value at a rate dependent on the stuffing ratio. Preferred algorithms are disclosed for determining both the stuffing ratio and current jitter signal value.

14 Claims, 6 Drawing Sheets

JITTER MEASUREMENT METHOD AND APPARATUS

BACKGROUND OF THE INVENTION

The present invention relates to a method and apparatus for measuring the timing jitter of a tributary data stream that has been multiplexed into a higher-rate multiplex stream using pulse stuffing techniques.

Timing jitter is the short term variation of the significant instants of a data signal from their expected or average positions, the amplitude and frequency of the variation constituting the amplitude and frequency of the jitter waveform. Various ways of measuring the timing jitter of a data signal are known, one such way being described in U.S. Pat. No. 3,737,766 (Lubarsky). In this patent, the jitter amplitude of a signal is determined by comparing the actual zero crossings of the signal with their expected occurrences as predicted by an averaging process carried out on the previous actual occurrences of the zero crossings.

The present invention is concerned with the measurement of the timing jitter of a data signal where the signal has been multiplexed into a higher-rate multiplex stream using pulse stuffing techniques. Pulse stuffing is a process where the bit rate of a digital tributary stream is brought up to the rate of occurrence of time slots for that tributary in the multiplex stream by the insertion of a dummy bit or the repetition of selected tributary bits, each insertion or repetition constituting a "stuff". Each stuff may be viewed as advancing the phase of the tributary stream relative to a reference representing the average rate of occurrence of tributary time slots in the multiplex stream, the phase of the tributary thereafter falling back relative to the reference until the next stuff causes a further advance. The rate of tributary phase slippage between stuffs is, of course, dependent on the discrepancy between the tributary frequency and that of the aforesaid reference.

In practice, stuffing opportunities are only presented at fixed intervals corresponding to predetermined time slots in the multiplex stream; whether or not any particular stuffing opportunity is taken up will depend on the current phase lag of the tributary relative to the reference. Of course, in order to enable stuffed bits to be removed when demultplexing the tributary from the multiplex stream, it is necessary to provide some indication in the multiplex stream as to whether a time slot that could have been stuffed, does in fact contain a stuffed bit. This indication takes the form of stuffing control bits inserted at known locations in the multiplex stream.

Where the tributary data signal is free of jitter, it will lose phase at a constant rate dependent on the tributary frequency and this phase loss will be compensated for by stuffs at regular intervals. However, where the tributary exhibits jitter, its phase loss will not be at a constant rate with the result that stuffing will occur irregularly.

SUMMARY OF THE INVENTION

The present invention provides apparatus for measuring the timing jitter of a tributary data stream that has been multiplexed into a high-rate multiplex stream using pulse stuffing techniques, the multiplex stream including stuffing control bits indicative of the presence or absence of stuffs at predetermined positions in said multiplex stream. The apparatus includes monitoring means for receiving and monitoring the multiplex stream to detect the stuffing control bits included therein that relate to said tributary, the monitoring means being arranged to output both a first signal indicative of the occurrence of a stuff relating to said tributary, and a second signal indicative of the multiplex stream timing. The apparatus further includes first processing means arranged to receive said first and second signals and to derive therefrom an average-rate signal indicative of the average rate of phase loss of the tributary as compared to a notional reference related to the multiplex stream timing, and second processing means for deriving a jitter signal representative of the timing jitter of the tributary. The second processing means is arranged to receive both the said first signal and said average-rate signal and is operative to derive therefrom a current value for said jitter signal by updating a preceding value of the jitter signal, this updating involving increasing the jitter signal value by a predetermined amount for each stuff indicated by said first signal while effecting a decrease in jitter signal value at an average rate dependent on the value of said average-rate signal.

Where the tributary is jitter free, the increases in jitter value resulting from the presence of detected stuffs are equalled by the cumulative decrease reflecting the said average rate of phase loss. Where tributary jitter is present, however, the sum of the stuff related increases will differ from the cumulative decrease, the difference being indicative of the change in jitter value over the period under consideration.

The said average rate of phase loss could, for example, be determined by the first processing means in terms of the average time between stuffs; preferably, however, the stuffing ratio of the tributary is used as a measure of said average rate of phase loss (the stuffing ratio being a ratio relating the actual number of stuffs effected to the number of stuffing opportunities). More particularly, in jitter measurement apparatus as set out in the last preceding paragraph but one, the first processing means is preferably arranged to determine the stuffing ratio of the tributary with the second signal being used in this determination to provide an indication of the occurrence of each stuffing opportunity relating to the said tributary, and the first processing means being further arranged to output as said average-rate signal a signal indicative of said stuffing ratio. The second signal can be derived directly from the stuffing control bits though this is not essential inasmuch as equivalent timing information could be derived, for example, from framing bits included in the multiplex stream.

In one preferred embodiment, the first and second processing means are jointly implemented as a digital filter arranged to receive said first signal as its input signal and to be clocked by said second signal at a rate corresponding to the rate of occurrence of stuffing opportunities relating to said tributary, the transfer function of the digital filter being such that the output of the filter is representative of the timing jitter of said tributary.

BRIEF DESCRPTION OF THE DRAWINGS

There now follows a detailed description which is to be read with reference to the accompanying drawings of digital jitter measurement apparatus; it is to be understood that the digital jitter measurement apparsatus has been selected for description to illustrate the invention by way of example and not by way of limitation.

DESCRIPTION OF THE PREFERRED EMBODIMENT

The jitter measurement apparatus to be described hereinafter is intended to monitor a DS2 multiplex stream in order to determine the timing jitter of a selected one of the four DS1 tributaries multiplexed into the DS2 stream (the designations DS1 and DS2 refer, of course, to the well known Bell digital hierarchy widely used in the North American continent).

Figure 1:
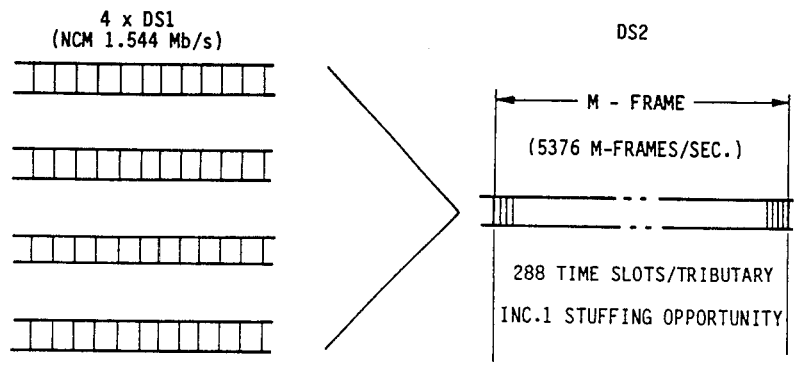
FIG. 1 is a diagrammatic depiction of the multiplexing of four DS1 tributaries into a DS2 multiplex stream.

As indicated in FIG. 1, four DS1 tributaries (of a nominal rate of 1.544 Mb/s) are multiplexed into a common DS2 stream using pulse stuffing techniques. More particularly, the DS2 stream is divided into a succession of M-frames that occur at a rate of 5376 M-frames/sec and each M-frame includes, for each tributary, 288 time slots arranged to accommodate corresponding bits of the tributary.

The rate of occurrence of time slots/tributary in the DS2 frame structure is, in fact, arranged to be slightly greater than the bit rate of the tributaries; thus, for example, one of the DS1 tributaries may have a bit rate equivalent to 287.5 bits per M-frame and will, therefore, lose phase relative to the M-frame structure at half a bit/M-frame. To compensate for this phase loss, an opportunity is provided once every M-frame for one of the bits of the DS1 tributary to be repeated whereby to bring the effective bit rate of the DS1 tributary up to that of the rate of occurrence of time slots for that tributary in the DS2 stream. This opportunity to repeat a bit is termed a stuffing opportunity and the actual repetition of a bit is known as a stuff; in the example previously given where the DS1 tributary has an actual bit rate equivalent to 287.5 bits/M-frame, every other stuffing opportunity is taken up in order to bring the effective DS1 bit rate up to the rate of occurrence of M-frame time slots, that is 288 time slots/M-frame. The possibility of taking up or ignoring a stuffing opportunity once every M-frame permits variations of the DS1 bit rate to be compensated for, the maximum stuffing rate being 5376 stuffs/sec (that is, the M-frame rate).

Figure 2:
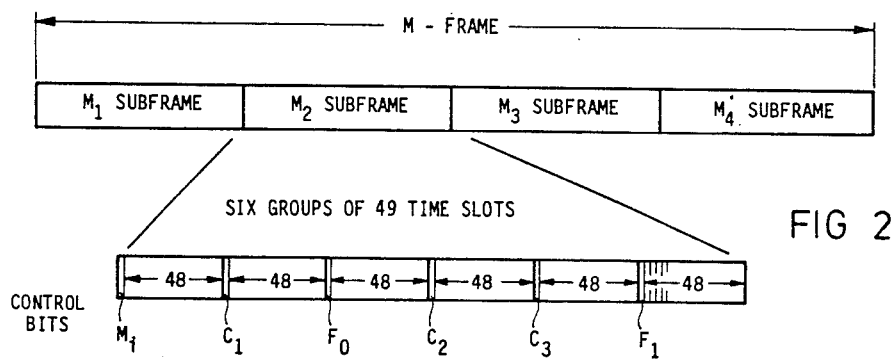
FIG. 2 is a diagram of the M-frame and subframe structure of a DS2 stream.

FIG. 2 shows the detailed structure of each M-frame, each such frame being composed of four subframes, M1 to M4. Each subframe is, in turn, composed of six groups of 49 time slots, the first one of each of which contains a control bit while the remaining 48 slots contain twelve bits from each DS1 tributary interleaved with one another. The six control bits of each subframe are constituted by an M-frame alignment bit M which in the four successive subframes of an M-frame takes on the values '011X'; two subframe alignment F bits with values $F_0 = 0$ and $F_1 = 1$; and three stuffing control bits $C_1$, $C_2$ and $C_3$ which each normally convey the same information regarding the presence of stuffs in the DS2 stream.

In the first subframe $M_1$ the stuffing control bits C indicate by their '0' or '1' status whether or not a stuff is present for the current M-frame in respect of the first DS1 tributary; a stuff, where present, is included in the first relevant DS1 time slot after the $F_1$ control bit of the first subframe $M_1$. In the second subframe $M_2$, the stuffing control bits C indicate whether or not a stuff is present for the current M-frame in respect of the second DS2 tributary; a stuff, where present, is included in the first relevant DS1 time slot after the $F_1$ control bit of the second subframe $M_2$. In a similar manner, the stuffing control bits C of the third and fourth subframes indicate whether a stuff has occurred for the third and fourth DS1 tributaries.

The stuffing control bits C permit the removal of the repeated or 'stuffed' bits upon demultiplexing of the DS2 stream into its constituent DS1 tributaries, the presence or absence of a stuff being judged on a majority voting basis of the three stuffing control bits relevant to each stuffing opportunity.

Figure 3:
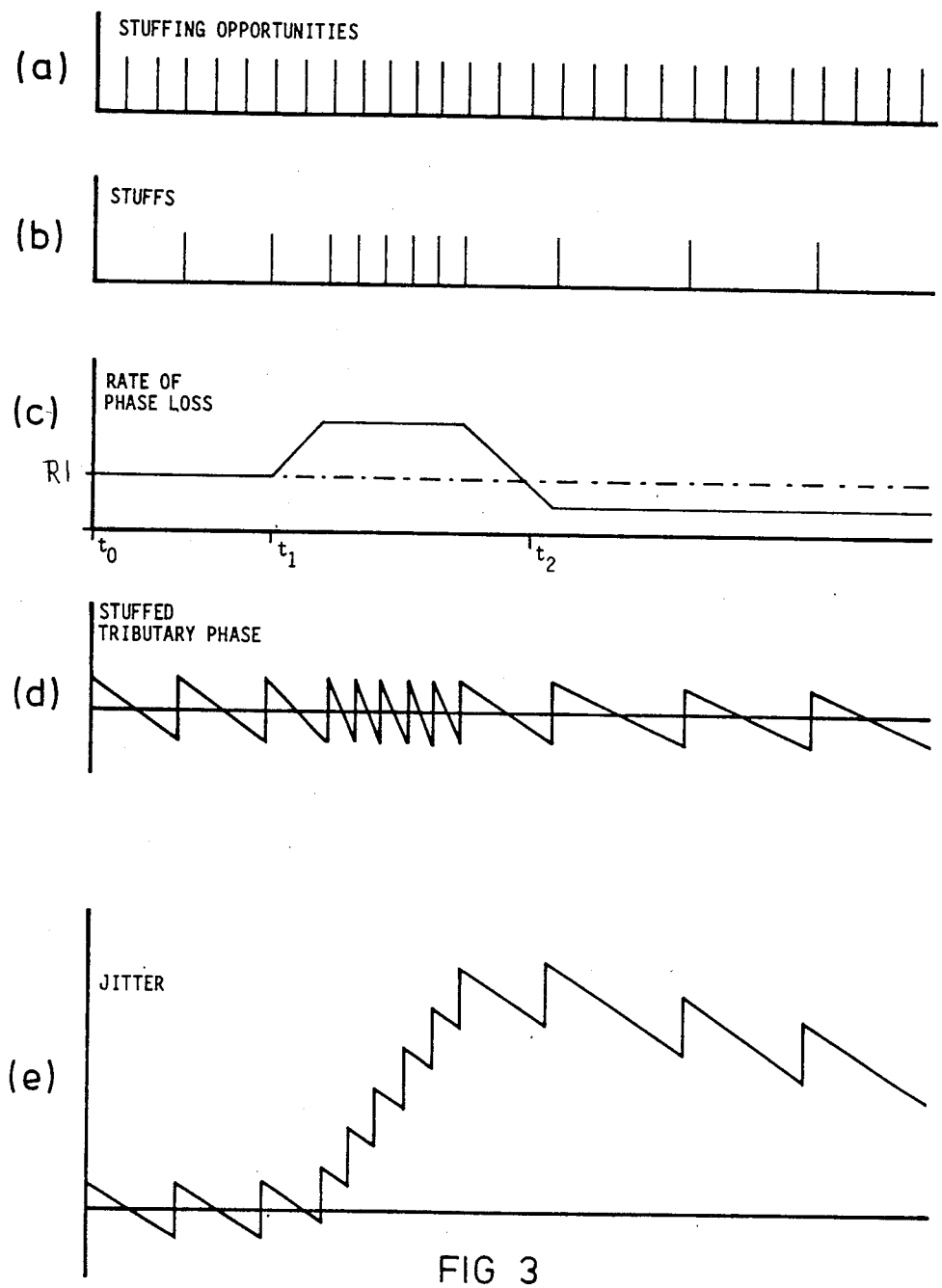
FIG. 3 shows various time graphs illustrating the derivation of a tributary jitter signal from the stuffing information contained in the multiplex stream.

The digital jitter measurement apparatus to be described hereinafter with reference to FIGS. 6 to 9 is arranged to derive a jitter signal representative of the timing jitter of a selected one of the DS1 tributaries by utilising the stuffing information contained in the stuffing control bits C relevant to that tributary. However, before describing the circuitry of the jitter measurement apparatus, its general principle of operation will first be reviewed with reference to FIG. 3.

FIG. 3a depicts the regular occurrence of stuffing opportunities in the DS2 stream for a selected one of the DS1 tributaries; FIG. 3b depicts the actual occurrence of stuffs for the same tributary. The average bit rate of the DS1 tributary is such that the tributary loses phase at an average rate R1 (FIG. 3c) relative to the rate of occurrence of associated time slots in the DS2 stream; in the present example, R1 corresponds to one-third of a bit per M-frame. In order to compensate for this phase loss, every third stuffing opportunity must, on average, be taken up.

In FIG. 3c, the instantaneous rate of tributary phase loss is shown by the solid line and can be seen to correspond to the average rate R1 (shown chain dashed) for an initial period t0–t1. Thereafter, the instantaneous phase loss rate exceeds R1 for a period t1–t2 and then falls below the average rate R1 for a period subsequent to t2, these latter variations being due to timing jitter in the DS1 tributary concerned. The variations in instantaneous phase loss rate are reflected by variations in the frequency of stuffing required to compensate for the phase lost by the tributary. Thus for the period t0–t1, every third stuffing opportunity is taken up while for the period t1–t2 more stuffing opportunities are used to compensate for the greater rate of phase loss; subsequent to t2, less than one in three stuffing opportunities are used.

FIG. 3d shows the variations in phase of the stuffed tributary, the tributary phase decreasing at a rate corresponding to the instantaneous phase loss rate of the unstuffed tributary and intermittently undergoing a step increase when a stuffing opportunity is taken up and the tributary is stuffed.

FIG. 3e is similar to 3d but now instead of the step increases in phase due to stuffs being joined by lines having slopes representing the instantaneous phase loss rate of the unstuffed tributary, these joining lines are given a slope representative of the average phase loss rate R1. The resultant waveform is indicative of the timing jitter of the tributary under consideration. Intuitively, this can be seen to be the case by noting that taken together the stuffs (the verticals of FIG. 3e) represent the total actual phase loss of the tributary (with respect to a reference based on the DS2 stream timing) whereas the average-rate sloped lines represent the aggregate tributary phase loss had the tributary been losing phase at the average rate R1; the difference between these two phase loss totals corresponds to the departure of the significant instances of the tributary from their expected occurrences (that is, the jitter of the tributary) and it is this difference that the FIG. 3e waveform represents. Thus, for the period t0-t1 where the instantaneous phase loss rate of the tributary equals the average rate R1 (in other words the tributary is jitter free), the average level of the FIG. 3e waveform is zero whereas for the period t1-t2 where the instantaneous tributary phase loss rate exceeds the average rate R1, the level of the FIG. 3e waveform progressively increases as the significant instances of the tributary occur progressively later than expected (that is, jitter is present). During the period t2 onwards, the instantaneous phase loss rate is less than the average rate R1 so that the level of the FIG. 3e waveform starts to fall back to zero as the significant instances of the tributary begin to return towards their expected occurrences.

The construction of the FIG. 3e waveform requires a knowledge of the occurrence of the stuffs and also a knowledge of the average rate of phase loss; the required knowledge can be obtained from the relevant stuffing control bits of the DS2 stream together with a timing reference related to the stream timing. Conveniently, the timing reference is provided as a signal representing the occurrence of stuffing opportunities as then the average rate R1 can be readily determined as the stuffing ratio of the tributary (the stuffing ratio being a ratio of the number of stuffs effected to the number of stuffing opportunities presented).

Figure 4:
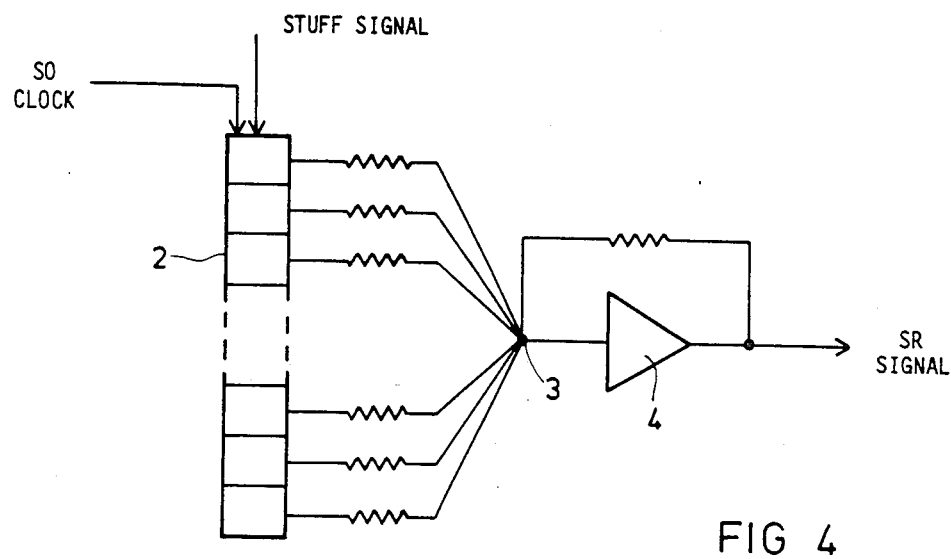
FIG. 4 is a block diagram of a basic circuit for deriving the stuffing ratio of a tributary.
Figure 5:
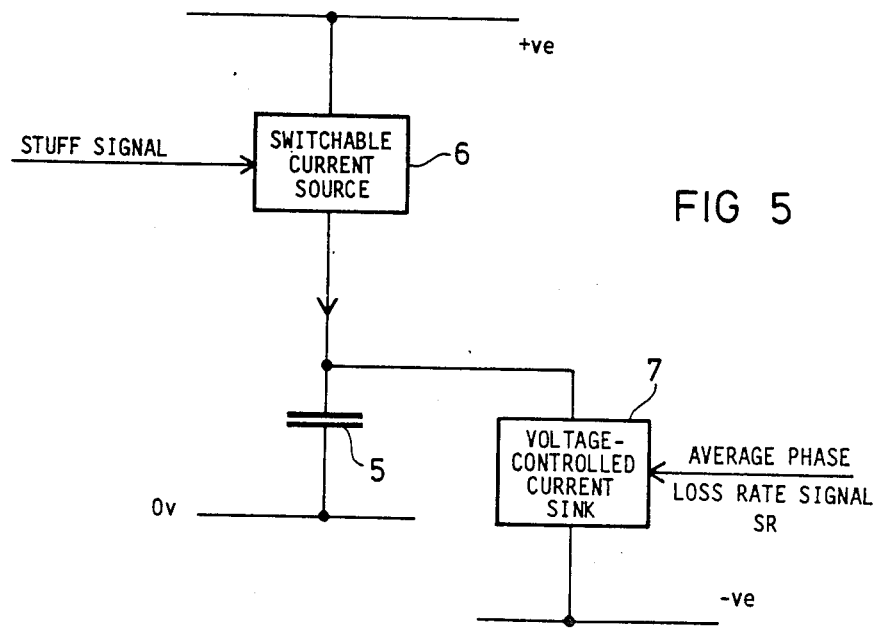
FIG. 5 is a block diagram of a basic analog circuit for deriving a tributary jitter signal according to a procedure outlined with reference to FIG. 3.

To facilitate an understanding of the present invention, FIGS. 4 and 5 show circuitry for deriving, in a simple manner, the value J of the FIG. 3e jitter waveform from a signal 'SO clock' representing the occurrences of stuffing opportunities and a logic stuff signal representing the occurrences of stuffs (this signal having a logic value 'X' of '1' to represent a stuff). For reasons which will become apparent, the embodiment of the invention to be described hereinafter with reference to FIGS. 6 to 9 is preferred to that now to be outlined with reference to FIGS. 4 and 5.

In the FIG. 4 circuitry, the stuff signal and SO clock signal are used to derive a signal SR representative of the tributary stuffing ratio. This circuitry includes a shift register 2 clocked by the SO clock signal and receiving the stuff signal as its data input. The output of each shift register stage is fed to a summing node 3 of an op-amp 4. The output of the op-amp 4 is a voltage signal SR representative of the tributary stuffing ratio over an immediately preceding period the duration of which depends on the number of stages in the shift register 2.

The FIG. 5 circuitry is analog circuitry arranged to construct the jitter waveform of FIG. 3e by adding charge to a capacitor 5 each time a stuff occurs while subtracting charge at a rate dependent on R1, the resultant voltage across the capacitor representing the current jitter value. More particularly, the stuff signal is used to turn on a constant current source 6 for a short fixed period each time a stuff occurs whereby to add a fixed amount of charge to the capacitor 5. The capacitor 5 is drained at a constant rate by a voltage-controlled current sink 7 fed with the stuffing - ratio voltage signal SR produced by the FIG. 4 circuitry (or, indeed, in any other suitable manner). The resultant amount of charge held by the capacitor 5, and thus the voltage thereacross, represents the current jitter value $J_1$.

The FIG. 5 circuitry can be seen to derive the jitter value $J_1$ at time t in accordance with the general relationship:

$$J_1 = J_0 + Q - P$$

where:
$J_0$ is a preceding jitter value at some time T earlier than t;
Q is a quantity dependent on the number of stuffs, if any, occurring in the period T to t, this quantity representing the total phase gain due to the stuffs;
P is the time integral of the value S of the stuffing ratio signal SR (or other average rate signal) over the period T to t and thus represents the average phase loss over this period.

$J_0$ could be an initial value (for example, zero) applicable at the start of measurement (T=0) with Q and P thereafter being separately evaluated and used to determine $J_1$ in accordance with the foregoing relationship. This is not, however, an efficient procedure and $J_0$ will generally be constituted by the last preceding value of $J_1$ with the new value of $J_1$ being derived by changing $J_0$ by the incremental changes in Q and P; the FIG. 5 circuitry operates on this latter principle in a continuous manner.

Figure 6:
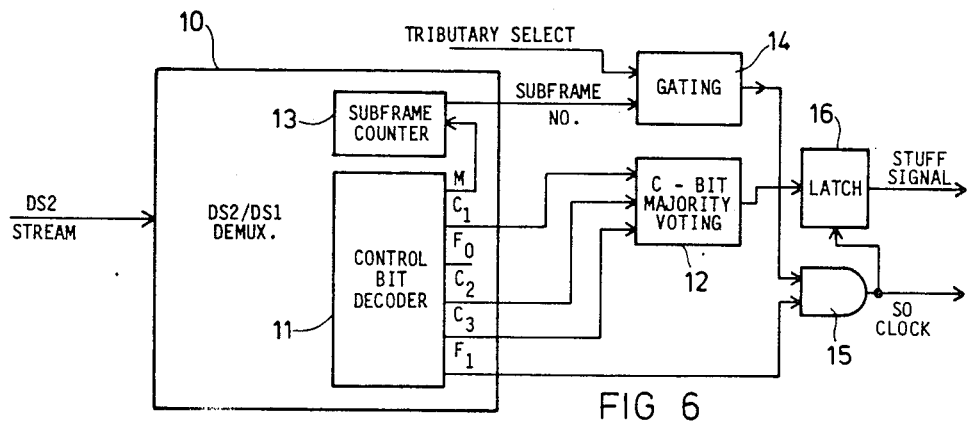
FIG. 6 is a block diagram of a dual-microprocessor processing arrangement of the preferred form of jitter measurement apparatus embodying the invention.
Figure 7:
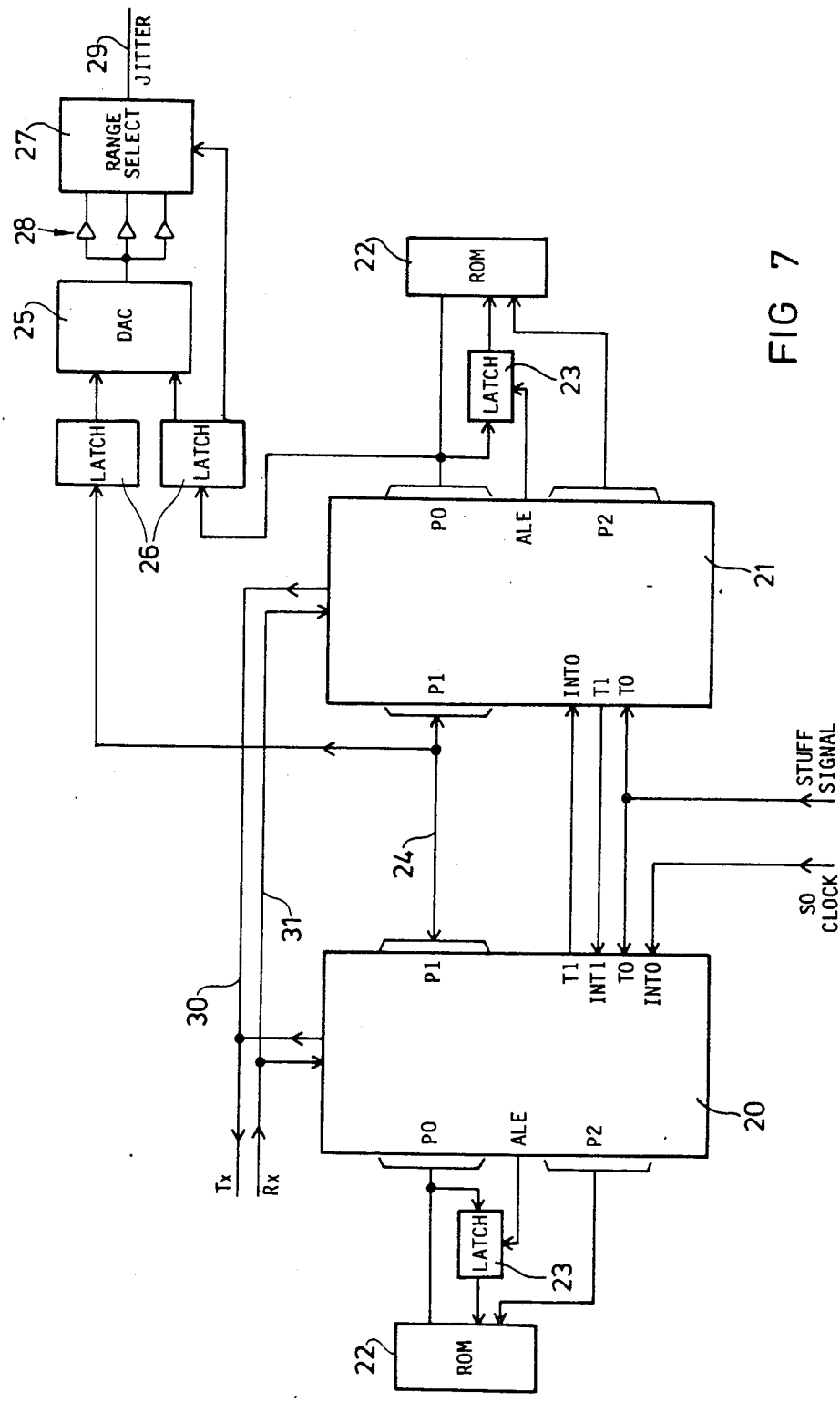
FIG. 7 is a block diagram of a dual-microprocessor processing arrangement of the preferred form of jitter measurement apparatus.
Figure 8:
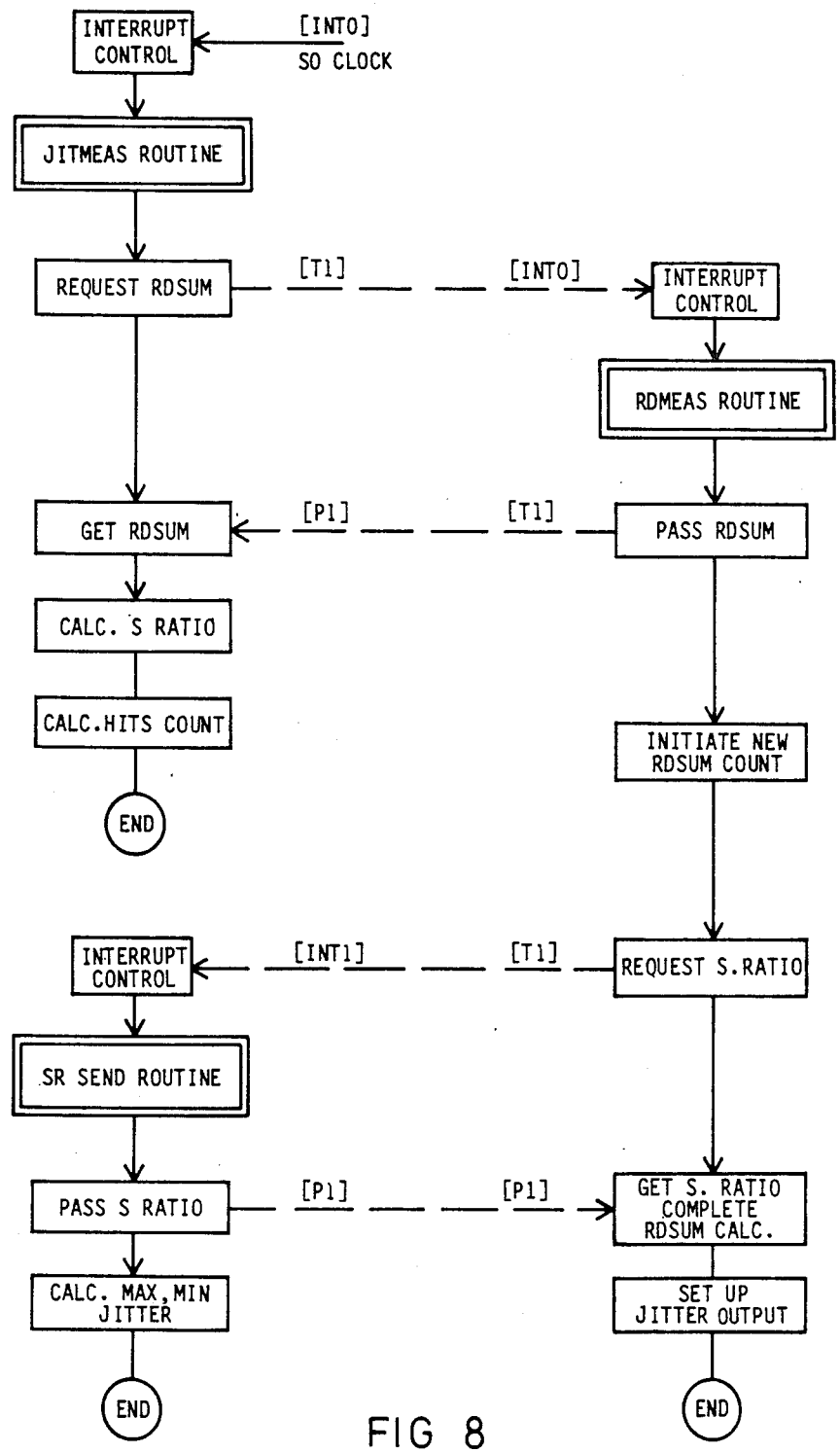
FIG. 8 is a flow chart of the main jitter measurement routines of the FIG. 7 dual-microprocessor arrangement.

The jitter measurement apparatus to be described hereinafter with reference to FIGS. 6 to 8 is digital in form and for such apparatus J is advantageously evaluated following each stuffing opportunity with the last-determined value of $J_1$ being used as the value $J_0$ in each new determination; in this case, the value of $J_1$ at time t is given by:

$$J_1 = J_0 + X - S$$

where:
$J_0$ is the value of J at reference time T=(t−1), a unit of time being taken, for convenience, to be the time between stuffing opportunities;
X is the logic value of the stuff signal for the last preceding stuffing opportunity (for convenience, Q is taken as having a unit value).

Note that the value S of the stuffing ratio signal is taken as constant over the unit period (t−1) to t so that the time integral P of this value S for this period is also S.

In the digital apparatus to be described, both the stuffing ratio value S and the current jitter value $J_1$ are evaluated using refined versions of the procedures discussed above. More particularly, it will be appreciated that the period over which the stuffing ratio is evaluated is critical in determining whether a change in tributary phase loss rate is treated as jitter or an underlying change in the average phase loss rate R1. Since it may well be required to detect jitter down to frequencies of the order of milliHertz, the period for evaluating the stuffing ratio must be considerable; clearly, the circuitry of FIG. 4 cannot conveniently be used for the sort of periods required as the number of shift register stages needed would be very large. On the other hand, the stuffing ratio signal must be responsive to long term changes in tributary phase loss rate as otherwise a step change in the underlying tributary frequency (and thus phase loss rate) will result in the jitter value ramping off to infinity. To meet these difficulties, the following depletion algorithm is used to calculate a value S for the stuffing ratio following each stuffing opportunity;

$$S_1 = \frac{S_0(M-1) + X}{M} \quad (3)$$

where:
$S_1$ is the value of S at time t;
$S_0$ is the value of S at time (t−1);
X has its previously assigned significance; and
M is a constant representing the averaging period in terms of stuffing opportunities.

The greater the value of M in the above relationship, the greater is the effective time constant of the algorithm to changes in tributary frequency.

Since a step change in the underlying tributary frequency will not immediately result in an appropriate adjustment of the stuffing ratio value, the jitter value will accumulate exponentially decreasing values of phase error until the stuffing ratio has properly adjusted. In order to perform measurements on the jitter waveform, it is, of course, desirable that the jitter signal mean has a constant value which does not change in response to step changes in underlying tributary frequency. To approximate to this ideal, a depletion algorithm is also used in the evaluation of $J_1$. Relationship (2) thus becomes:

$$J_1 = \frac{J_0(N-1) + X - S}{N} \quad (4)$$

where: N is a constant

The effective time constant of this algorithm is dependent on the chosen value of N.

While relationships (3) and (4) relate to evaluations carried out following each stuffing opportunity it will, of course, be appreciated that similar relationships can be readily derived where evaluations are carried out less frequently (for example, every other stuffing opportunity).

Generalization of relationships (3) and (4) over an arbitrary period of time, by replacing X with Q and replacing S with P, gives:

$$S_1 = [S_0 \cdot (M-1) + Q]/M \quad (5)$$

and $$J_1 = [J_0 \cdot (N-1)]/N - P + Q \quad (6)$$

Digital jitter measurement apparatus employing the stuffing ratio and jitter value depletion algorithms expressed in relationships (3) and (4) above, will now be described with reference to FIGS. 6 to 9. In this apparatus, M and N are in fact equal to each other (but with the possibility of setting four different values), and the jitter value J is represented by an all positive digital value RDsum that is arranged to have a value K in the absence of jitter (in other words, $J = RDsum - K$).

FIG. 6 illustrates, in diagrammatic form, suitable monitoring circuitry for extracting from a DS2 stream the stuffing information relevant to a selected tributary, the circuitry being arranged to output an S0 clock signal indicative of stuffing opportunities relating to the tributary and a stuff signal the logical value X of which indicates the presence or absence of a stuff.

The FIG. 6 circuitry is built around a DS2/DS1 demultiplexer 10 of standard form well known to persons skilled in the relevant art. The demultiplexer 10 includes a control bit decoder 11 operative once the demultiplex has correctly locked onto the framing structure of the DS2 stream, to output signals indicative of the state of each control bit within each subframe.

The three stuffing control bits $C_1$, $C_2$, $C_3$ are fed from the decoder 11 to a C-bit majority voting circuit 12 which outputs a single signal representative of the predominant value of the three control bits in each subframe.

The M bit output of the decoder 11 is fed to a subframe counter 13 which determines from the received sequence of M bits, the number of the current subframe. This subframe number is output to a gating circuit 14 which is also fed with the number of the tributary the jitter of which it is desired to measure. The circuit 14 is arranged to output an enable signal during each subframe that contains stuffing information relevant to the selected tributary.

The enable signal from the circuit 14 is fed to an AND gate 15 together with the $F_1$ bit output of the decoder 11 whereby to produce a clock signal at the M-frame rate which is synchronised with $F_1$ bits of the subframe carrying stuffing information relevant to the selected tributary; this clock signal can be considered as indicative of the occurrence of stuffing opportunities for the selected tributary and thus constitutes the S0 clock signal.

The S0 clock signal is used to clock a latch 16 fed with the output of the C-bit majority voting circuit 12. The output of the latch 16 constitutes the required stuff signal with a logic value X which provides an indication of whether or not the latest stuffing opportunity has been used to stuff the selected tributary (X having a value of '1' if a stuff has occurred and '0' if no stuff has been effected).

The S0 clock signal and the stuff signal constitute the output signals of the FIG. 6 monitoring circuitry and these signals are fed to a signal processing arrangement (FIG. 7) which is operative to determine a current value of jitter for the selected DS1 tributary.

The FIG. 7 signal processing arrangement is built around two Intel 8031 8-bit microprocessors 20 and 21 which together with associated circuitry and programs form respective processors designated JMU and SMU respectively. As will be more fully described hereinafter, the JMU processor is arranged to calculate a current stuffing ratio value $S_1$ in accordance with relationship (3) above while the SMU processor is arranged to utilise relationship (4) to calculate a running digital sum (RDsum) representative of the current jitter value $J_1$ (the SMU processor reading in the current stuffing ratio value from the JMU processor during each determination of $J_1$). The use of the two processors JMU and SMU is required due to the tight time constraints placed on the system by having the stuffing ratio and current jitter value updated following every stuffing opportunity.

Referring to FIG. 7 in detail, the microprocessor 20, 21 of each of the processors JMU and SMU, is clocked at 15 MHz (by a common clock) and operates under the control of assembly-language programs stored in a ROM memory 22. The data lines of the memory 22 are connected to port P0 of the microprocessor while the memory address lines are controlled from the microprocessor ports P0 and P2. As is standard, the low address byte and the data are multiplexed on port P0 with the low address being latched into a latch 23 under the control of an ALE (address latch enable) signal output by the microprocessor 20, 21.

The stuff signal from the FIG. 6 monitoring circuitry is fed to an input T0 of each microprocessor 20, 21 while the S0 clock signal is fed to a high-priority interrupt input INT0 of the microprocessor 20 (the JMU processor). An output T1 of the SMU microprocessor 21 is connected to a low-priority interrupt input INT1 of the JMU microprocessor 20 while an output T1 of the JMU microprocessor 20 is connected to a high-priority interrupt input INT0 of the SMU microprocessor 21. These connections permit the microprocessors to demand information from each other, the actual information being passed via a bus 24 interconnecting the microprocessor ports P1.

The ports P0 and P1 of the SMU microprocessor 21 also serve for the output of the current running digital sum value (the current jitter value) to a digital-to-analog converter 25, the data output on ports P0 and P1 being first latched into latches 26. In fact, only five bits of the output of port P0 are used and of these only the two most significant bits relate to the running digital sum, the remaining three bits being used to select one of three possible output ranges. This range or scale selection is effected by the selective enabling of one of three analog switches (block 27), each switch being associated with a respective amplifier 28 connected between the output of the DAC converter 25 and an analog jitter output 29; the amplifiers 28 have different gains corresponding to the desired output scale.

Control of the JMU and SMU microprocessors 20, 21 (for example, to set the value of M in relationships (3) and (4) above and for scale selection) is effected via shared transmit and receive lines 30,31 which serve to provide unbalanced normal class communication. In the present example, the lines 30, 31 serve to communicate the microprocessors 20, 21 with a central control microprocessor (not shown as it forms no part of the present invention).

It will be appreciated that in FIG. 7 various of the microprocessor control lines such as the read/write lines have been omitted for reasons of clarity; the functions of such lines are, of course, well understood by persons skilled in the relevant art.

The JMU and SMU processors are arranged to run a number of programs or routines, the most important of which are interrupt initiated while the remainder are background routines. Table 1 lists the routines run by the processors.

The three most important routines JITMEAS, SRSEND, and RDSUM, are linked in a sequence that is set running by each S0 clock pulse, the routines JITMEAS and SRSEND being carried out by the JMU processor to calculate the current stuffing ratio and pass this value to the SMU processor, and the routine RDSUM being carried out by the SMU processor to calculate the current jitter value as represented by the running digital sum RDsum. The routine JITMEAS also serves to keep a 'hits count' (that is, a count of the number of times the jitter value exceeds a preset threshold) while the routine SRSEND additionally determines the maximum and minimum jitter values over a gating period determined by the value of M set for implementing relationships (3) and (4).

The passing of particular values of adjustable measurement parameters to the two processors over the line 31 is handled by respective routines CDENTER, the parameters concerned being the parameter M, the output scale provided by DAC 25 and amplifiers 28, and the 'hits' threshold.

TABLE 1

|  |  | JMU |  | SMU |
|---|---|---|---|---|
| MAIN MEASUREMENT ROUTINES (Interrupt Driven) | JITMEAS | Calculates new stuffing ratio and monitors 'hits'. | RDMEAS | Calculates RDsum and sends output to DAC 25. |
|  | SRSEND | Provides stuffing ratio to SMU for use in calculating RDSUM. Determines max.min jitter. |  |  |
| COMMUNICATION ROUTINES | CDENTER | Transmits and receives information over link 30,31. | CDENTER | Transmits and receives information over link 30,31. |
| BACKGROUND ROUTINES | MCONTROL | Monitors settling of jitter mean. Controls resetting of measurement parameters. Calculates jitter amplitude. Controls output of measurement results. | MCONTROL | Monitors settling of jitter mean. Controls resetting of measurement parameters and output of results. Initiates calibration and self-test if necessary. |
|  | SELFTEST | Tests RAM, ROM and SMU/JMU communications. | CLBRT | Outputs square-wave at DAC25 output. |
|  |  |  | SELFTEST | Tests RAM, ROM and SMU/JMU communications. |

The routine CDENTER for the SMU microprocessor 21 is interrupt driven via the low priority interrupt of the microprocessor 21; however, for the JMU microprocessor, a polling technique must be used since the microprocessor has only two interrupt levels both already in use.

The routines CDENTER are also used to output on line 30 digital jitter measurement results including the 'hit count' and peak-to-peak jitter values.

As background routines, the JMU and SMU are arranged to run main background routines MCONTROL responsible (a) for checking that the measured jitter value has settled to a stable level, (b) for effecting certain less important jitter parameter measurements, (c) for calling the CDENTER routines when measurement results are to be output on line 30, and (d) for initiating self-test and calibration routines SELFTEST and CLBRT.

So far as the jitter measurement process of the present invention is concerned, the routines of major relevance are, of course, JITMEAS, SRSEND and RDSUM; however, the portion of the MCONTROL routines that checks whether the measured jitter signal mean has settled to an acceptable value (the LOCK condition) is also of interest. The structure of these latter routines will be now described with reference to the flow charts of FIGS. 8 and 9. As for the remaining routines, they can be implemented in a wide variety of ways to suit particular circumstances and the writing of suitable routines is well within the capability of persons skilled in the relevant art; accordingly, these routines will not be further described in detail herein.

The interworking of the JMU and SMU processors in executing the routines JITMEAS, SRSEND and RDMEAS is illustrated in FIG. 8. Upon an S0 clock pulse being received by the JMU microprocessor 20 at its input INT0, the JMU processor enters an interrupt process which installs the routine JITMEAS. The first action of this routine is to pass a request to the SMU processor for the current value of the running digital sum RDsum, this request being routed via the JMU microprocessor output T1 and the SMU microprocessor input INT0. The request from the JMU processor causes the SMU processor to install the RDMEAS routine. The first operation performed by the RDMEAS routine is to pass the currently stored value of RDsum to the JMU processor via the bus 24 (microprocessor ports P1).

On receipt of the RDsum value, the JMU processor, under the control of the JITMEAS routine, calculates a new value for the stuffing ratio in accordance with relationship (3) given above and the currently set value of M; during this process, the JMU processor reads in the current logical value X of the stuff signal fed to the input T0 of the microprocessor 20. After calculating the new stuffing ratio value, the JMU processor next checks whether the latest RDsum value read in from the SMU processor has taken RDsum over the current 'hits' threshold; if this is the case, a further 'hit' is recorded (note that a 'hit' is defined in terms of a transition over the threshold rather than in terms of how long the threshold is exceded). Once the 'hits' count has been updated, the JMU processor terminates the JITMEAS routine and returns to the background routine that was being executed immediately prior to receipt of the last preceding S0 clock pulse.

With respect to the RDMEAS routine running on the SMU processor, after this routine has passed the RDsum value to the JMU processor, it sets about determining a new value of RDsum in accordance with relationship (4) above and using the currently set value of M and the current value X of the shift-signal. In fact, depending on the value of M, the detailed manner of implementing relationship (4) may be varied to minimise the bit shifting and other operations used in the calculation process. Furthermore, the RDsum calculation is carried out in such a manner that the stuffing ratio value is only required towards the end of the calculation process whereby to ensure that the JMU processor has finished calculating a new stuffing ratio value before this value is required by the RDMEAS routine running on the SMU processor.

The actual request for the new stuffing ratio value is made by the SMU processor to the JMU processor via the INT1 interrupt of the microprocessor 20 and initiates the SRSEND routine in the JMU processor. The first operation of this latter routine is, of course, to pass the latest stuffing ratio value (via the microprocessor ports P1 and the bus 24) to the SMU processor which thereupon completes its RDsum calculation and outputs the new RDsum value, via port P1 of the microprocessor 21, to the DAC 25 as the current jitter value. After outputting the current RDsum value, the RDMEAS routine terminates and the SMU processor returns to its background routine.

Meanwhile the SRSEND routine, after overseeing the transfer of the current stuffing ratio value to the JMU processor, causes the JMU processor to update the stored maximum and minimum jitter values if so required (not that this updating is not carried out using the latest RDsum value calculated by the SMU processor, but rather, the RDsum value passed to the JMU processor during the JITMEAS routine). The SRSEND routine is also arranged to pass the maximum and minimum jitter values to a buffer area, for subsequent access by the JMU MCONTROL routine, if this latter routine has previously set a corresponding flag; this flag is, of course, cleared by the SRSEND routine upon passing the maximum and minimum values to the buffer area. Thereafter, the SRSEND routine terminates and the JMU processor returns to its background routine.

The JMU and SMU processors now continue carrying out their background routines until the next S0 clock pulse triggers the whole process again.

With respect to the transfer of the stuffing ratio and RDsum between the microprocessors 20,21 during the routines JITMEAS, RDMEAS and SRSEND, it is to be noted that for reasons of time efficiency, these transfers are not carried out using handshaking routines.

Instead, adequate coordination between the microprocessors is achieved by utilising the fact that the time taken to enter into an interrupt service routine has known maximum and minimum limits (in terms of machine cycles).

More particularly, the microprocessor that wishes to be passed data initiates a data request by interrupting the other processor; this other processor takes, in the present case, 3 to 5 machine cycles to enter the appropriate interrupt routine (routine RDMEAS for the SMU processor when the RDsum is requested by the JMU processor and SRSEND for the JMU processor when the stuffing ratio is requested by the SMU processor). Immediately the microprocessor which is to send data has entered the appropriate interrupt routine, it transfers the first data byte to the relevant output port (in this case, port P1) and holds it there for five machine cycles.

As a result, the requesting microprocessor can be certain that regardless of whether the sending microprocessor has taken 3, 4 or 5 cycles to enter its interrupt service routine, the first byte of the required data will be present during three particular machine cycles following its request for data (these three cycles corresponding to the last three of the five for which the data is output in the case where only three machine cycles are taken to implement the interrupt request, and the first three of the five where five machine cycles are taken). The requesting microprocessor is arranged to read the data in the second of the three machine cycles for which the data is certainly present.

Second and third bytes of data can, if required, be transferred in a similar manner with each byte being output for five machine cycles by the sending microprocessor.

It will be appreciated that although with different microprocessors to that described, the limits of variation in the time taken to respond to an interrupt request may be different, the foregoing data transfer method can still be used provided that the data is output for a period sufficient to ensure that the data is present during at least one common machine cycle (with respect to the time of request) for the two limiting cases of response time.

As already mentioned, provision is made for setting different values of the averaging parameter M for use in evaluation of relationships (3) and (4) by the JMU and SMU processors (it being recalled that in the present arrangement the quantity N in relationship (4) is made equal to M). In particular, four different values (designated in increasing order of magnitude, M0, M1, M2 and M3) can be selected via the controlling central microprocessor and the serial link constituted by the lines 30,31. The value of M selected will affect operation of the jitter measurement apparatus in two main ways, namely:

(a) the greater the selected value of M, the lower the minimum frequency of jitter detectable—this follows from relationship (3) above;
(b) the greater the selected value of M; the longer the settling time of the RDsum (jitter $J_1$) mean value to an acceptable level following start-up or a disturbance—this follows from relationship (4).

The settling of the RDsum mean to an acceptable level (that is, to within an acceptable distance of the required mean value K) is referred to as 'lock-up' and the actual time taken to achieve this condition will, of course, not be fixed for each value of M but will depend on the discrepancies between the currently held value for S and J (RDsum) and the actual values of the stuffing ratio and jitter. Situations in which the measurement process may be out of lock include following initial start-up, following a major change in a tributary parameter such as a change in frequency, or following a change in output scale (as this may result in a previously acceptable discrepancy between actual and required RDsum mean becoming unacceptable).

Table 2 gives typical values for the parameter M together with their associated lowest jitter frequencies measurable and comparative times to lock-up (the latter times being measured under the same conditions).

TABLE 2

| Averaging Parameter | Value of M | Min. Jitter Frequency | Comparative Lock-up Times |
|---|---|---|---|
| M0 | $2^9$ | 10 Hz | 1 s |
| M1 | $2^{15}$ | 0.16 Hz | 56 s |
| M2 | $2^{17}$ | 0.04 Hz | 4 mins 30 s |
| M3 | $2^{23}$ | 0.6 mHz | 7 hrs |

If it is desired to make accurate quantative jitter measurements, then such measurements should be made in the 'in-lock' condition and not prior to lock-up (the 'out-of lock' condition). Accordingly, as part of their background routines MCONTROL, the JMU and SMU processors are each arranged to determine the current state of lock and to set an internal bit appropriately (this LOCK bit is given a value '1' when the system is out of lock).

Figure 9:
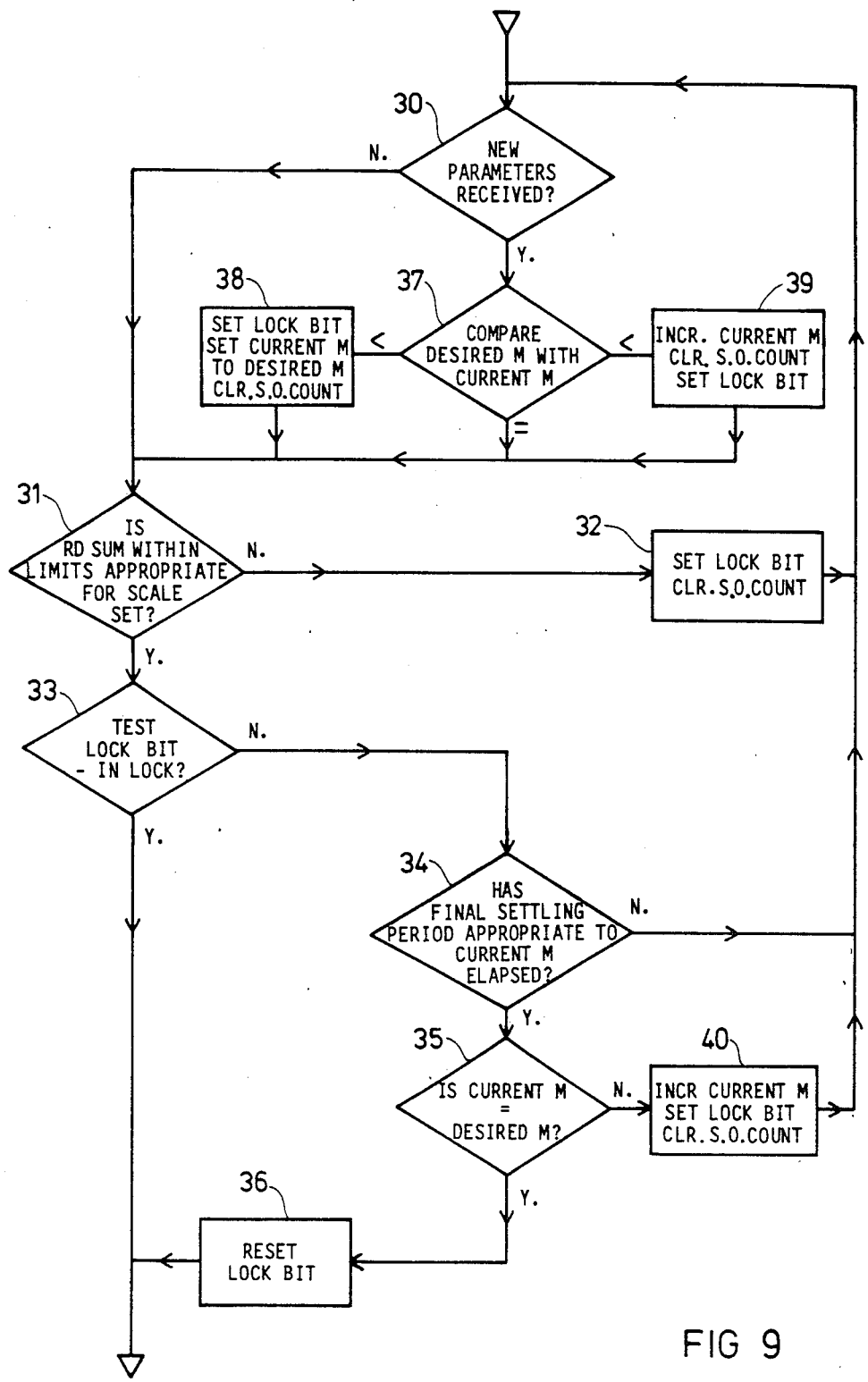
FIG. 9 is a flow chart of a measurement settling check routine for the FIG. 7 arrangement.

The section of the MCONTROL routines relevant to Lock state determination is depicted in flow chart form in FIG. 9. In general terms, lock state determination is carried out on the empirical basis that once the value of RDsum has fallen within certain limits determined by the set output scale, then the mean value of RDsum will settle to an acceptable level within an empirically-determined time-out period measured as a number of stuffing opportunities (this timeout period being, of course, dependent on the current value of M set). Thus, after an initial check (block 30) whether a new value of M has been requested by the central control processor (for the present, this will be assumed not to be the case), the JMU/SMU processor checks (block 31) whether, for the set output scale, the current RDsum value is within predetermined limits. If the RDsum value is not within the predetermined limits, then the LOCK bit is set to '1' (out of lock) and a count S0COUNT of stuffing opportunities is cleared (see block 32); thereafter the routine loops back to block 30.

In fact, where the current set value of the averaging parameter is M3, then large values of RDsum may be expected regardless of the scale set so that in this case (M3 set) a special set of limits can advantageously be used in the block 31 test, this set of limits being the same for all output scale settings (the set-scale-dependent limit testing remaining unchanged where the averaging parameter has a value of M0, M1 or M2).

The routine will loop round blocks 30, 31 and 32 unless and until the value of RDsum is within the appropriate set of limits whereupon a check is made (block 33) as to whether the LOCK bit is set. If the LOCK bit is set, this indicates that the system is half-way through the lockup process, that is, it has passed the limit test but the time-out period had not, at its last testing, fully elapsed. If the LOCK bit is not set, this indicates that the system was previously in lock and, following the test in block 31, can still be considered to be so; in this case, the section of routine illustrated in FIG. 9 is exited.

In cases where the Lock bit is found to be set, the routine next proceeds to check (block 34) whether in fact the time-out period has now elapsed. As previously noted, the duration of the time-out period is dependent on the value of M set and is measured in terms of stuffing opportunities, that is, by the count S0COUNT. This latter count is independently kept by both processors JMU and SMU, the JMU S0COUNT being, for example, incremented each time the JMU enters its JIT-MEAS routine and the SMU S0COUNT being, for example, incremented each time the SMU enters its RDMEAS routine. Since S0COUNT is cleared in block 32 when RDsum is found to be outside the limits tested by block 31, the value of S0COUNT tested in block 34 will be a measure of the time elapsed since RDsum first fell within the appropriate limits.

If the time-out period appropriate to the current value of M has not elapsed, the routine loops back from block 34 to block 30. If however, the time-out period has elapsed then, disregarding for the moment block 35, the LOCK bit is reset (block 36) as the measurement process is now locked-up; thereafter the section of routine shown in FIG. 9 is exited.

Returning now to a consideration of the procedure adopted if the test carried out in block 30 indicates that a new value of M has been requested, a comparison is first made between the desired value of M and that currently set (block 37). If these values are equal, then the routine proceeds directly to block 31. If the desired value of M is less than the current value (for example, the desired value is M1 and the current value M3), then the current value is set straight to the desired value (block 38), it being noted that if the measurement process were previously in lock, decreasing the value of M will generally not alter the lock state; since the measurement process may not have been in lock when the new value of M was requested, the S0COUNT is cleared (block 38) so that the subsequent lock-up time-out process will be correctly carried out.

If the desired value of M is greater than the current value (for example, the desired value is M3 and the current value is M1), then, of course, it would be possible simply to change the current value to the desired value and proceed accordingly. It should be noted that the fact that the measurement process was in lock prior to the increase in value of M is no guarantee that this will still be so after the increase and, accordingly, the LOCK bit must be set and the S0COUNT cleared. The foregoing procedure is, in fact, the one adopted for the case where the desired value of M is only one greater than the current value (see block 39). In cases where the difference between the desired and current values is greater than one, a modified procedure is adopted with a view to speeding up the settling process, that is, to reduce the overall time to lock-up (it being recalled that the higher the value of M, the longer the lock-up time). In particular, where the desired M exceeds the current M by more than one increment, then the desired M is approached by stepping up the current value of M one increment, achieving lock-up with the new current M, incrementing M again, achieving lock-up and so on until the current M is equal to the desired M. This process achieves lock-up at the desired value of M in a shorter time than simply directly setting the current value of M to the desired M, due to the fact that the settling time constant is not at the high level corresponding to the desired M for the whole of the settling process but is at a lesser value for a portion of this process.

In FIG. 9, this incremental procedure is achieved by incrementing the current M in block 39 and then once lock-up is achieved (block 34), testing whether the current value of M is that desired; if this is not the case, then M is incremented again (block 40) and the routine is looped back to achieve lock-up with the new value of M, this procedure being repeated until the current and desired values of M are equal.

The jitter measurement apparatus described with reference to FIGS. 6 to 9 can, of course, not only be used to measure the jitter of a selected DS1 tributary in a DS1 stream, but can also, with the addition of a DS3/DS2 demultiplexer, be used to measure jitter of a DS1 tributary in a DS3 stream (that is, a stream made up of seven DS2 streams).

It will be appreciated by persons skilled in the signal processing art that the JMU and SMU processors can be considered as forming a digital filter receiving the stuff signal as input and clocked by the S0 clock signal. The Z-transform transfer function of this digital filter can be readily derived from relationships (3) and (4) above on the basis that:

$$S_0 = S_1 Z^{-1}$$
$$J_0 = J_1 Z^{-1}$$

In particular, for a constant value of M, the transfer function takes the form $$J(Z) = \frac{X(Z) \cdot (M - 1)(Z - Z^2)}{M(Z - (M - 1)/M)^2} \quad (5)$$

where:
J(Z) is the output of the digital filter and represents the value of the jitter signal; and
X(Z) is the value of the stuff signal.

If the output of the filter is expressed in terms of quantity RDsum rather than J ($J = RDsum - K$), then a further term needs to be added to the right-hand side of relationship (5), this term being:

$$\frac{KZ}{M(Z - (M - 1)/M)}$$

Of course, in cases where M N in relationship (3) and (4), the above Z-transform transfer functions will need to be modified.

We claim:

1. Apparatus for measuring the timing jitter of a tributary data stream that has been multiplexed into a higher-rate multiplex stream using pulse stuffing techniques, the multiplex stream including stuffing control bits indicative of the presence or absence of stuffs at predetermined position in said multiplex stream, said apparatus comprising:

monitoring means for receiving and monitoring said multiplex stream to detect said stuffing control bits included therein that relates to said tributary, the monitoring means producing both a first signal indicative of the occurrence of a stuff relating to said tributary, and a second signal indicative of the multiplex stream timing;

first processing means responsive to said first and second signals to derive therefrom an average-rate signal indicative of the average rate of phase loss of the tributary as compared to a notional reference related to the multiplex stream timing; and second processing means for deriving a jitter signal representative of the timing jitter of said tributary, the second processing means responsive to both said first signal and said average-rate signal to derive therefrom a current value for said jitter signal by updating a preceding value of the jitter signal, this updating involving increasing the jitter signal value by a predetermined amount for each stuff indicated by said first signal while effecting a decrease in jitter signal value at an average rate dependent on the value of said average rate signal.

2. Jitter measurement apparatus according to claim 1, wherein the first processing means determines the stuffing ratio of the tributary with said second signal being used in this determination to provide an indication of the occurrence of each stuffing opportunity relating to said tributary, the first processing means further producing as said average-rate signal a signal indicative of the stuffing ratio.

3. Jitter measurement apparatus according to claim 2, wherein the first processing means evaluates the stuffing ratio at S, at regular intervals, in accordance with the following relationship:

$$S_1 = [S_0 \cdot (M-1) + Q]/M$$

where
$S_1$ is the value of S at time t,
$S_0$ is the value of S at time (t−1),
Q is a quantity dependent on the number of stuffs if any, occurring in the period (t−1) to t, and
M is constant.

4. Jitter measurement apparatus according to claim 3, wherein the first processing means reevaluates the stuffing ratio following each stuffing opportunity.

5. Jitter measurement apparatus according to any one of claims 2 to 4, wherein the second processing means determines the current jitter signal value at regular intervals in accordance with the following relationship:

$$J_1 = [J_0 \cdot (N-1)]/N - P + Q$$

where:
$J_1$ is the value of the jitter at time t,
$J_0$ is the value of the jitter at time (t−1).
P is a quantity indicative of the time integral of the stuffing ratio over the period (t−1) to t,
Q is a quantity dependent on the number of stuffs, if any occurring in the period (t−1) to t, and
N is constant, 6. Jitter measurement apparatus according to claim 5, wherein the second processing means redetermines the current jitter signal value following each stuffing opportunity, the current stuffing ratio value being used as the quantity P.

7. Jitter measurement apparatus according to claim 5, further comprising means for deciding when the mean value of the jitter signal has settled to an acceptable level.

8. Jitter measurement apparatus according to claim 7, wherein said means for deciding when the jitter signal mean value has settled to an acceptable level comprises means for determining when the jitter signal value has remained within preset limits for a predetermined period of time.

9. Jitter measurement apparatus according to claim 7, further comprising means for changing the value of N from a currently selected one of a predetermined plurality of possible values to a different, desired one of said values; said means for changing the value of N, when changing the currently selected value of N to a said desired value which is greater than the current value, repeating the following operational cycle until the current value corresponds to the desired value, said cycle comprising:

increasing the current value of N to the next adjacent possible value in said plurality, and
keeping the current value at this value until the jitter signal mean value has settled to an acceptable level.

10. Jitter measurement apparatus according to claim 5, further comprising means for changing the value of N from a currently selected one of a predetermined plurality of possible values to a different, desired, one of said values.

11. Jitter measurement apparatus according to claim 2, wherein said first and second processing means comprise respective microprocessors arranged to inter-communicate without handshaking.

12. Apparatus for measuring the timing jitter of a tributary data stream that has been multiplexed into a higher rate multiplex stream using pulse stuffing techniques, the multiplex stream including stuffing control bits indicative of the presence or absence of stuffs at predetermined positions in said multiplex stream, said apparatus comprising:

monitoring means for receiving and monitoring the multiplex stream to detect the stuffing control bits included therein that relate to said tributary, the monitoring means producing both a first signal indicative of the occurrence of a stuff relating to said tributary, and a second signal indicative of the multiplex stream timing, and, a digital filter receiving said first signal as its input signal and clocked by said second signal at a rate corresponding to the rate of occurrence of stuffing opportunities relating to said tributary, the transfer function of the digital filter being such that the output of the filter is representative of the timing jitter of said tributary.

13. Jitter measurement apparatus according to claim 12, wherein said digital filter has a Z-transform transfer function of the following general form:

$$J(Z) = \frac{X(Z) \cdot (M-1)(Z - Z^2)}{M[Z - (M-1)/M]^2}$$

where:
J(Z) is the output of the digital filter and represents the current value of the jitter signal;
X(Z) is the current value of said first signal and is indicative of the presence or absence of a stuff at the last preceding stuffing opportunity; and
M is a constant.

14. A method of measuring the timing jitter of a tributary data stream that has been multiplexed into a higher-rate multiplex stream using pulse stuffing techniques, the multiplex stream including stuffing control bits indicative of the presence or absence of stuffs at predetermined positions in said multiplex stream, said method comprising the steps of:

monitoring the multiplex stream to detect the stuffing control bits included therein that related to said tributary;
utilizing the stuffing control bits to determine both the occurrence of a stuff relating to said tributary and the stuffing ratio of the tributary; and
deriving a current value for a jitter signal representative of the tributary timing jitter by updating a preceding value of the jitter signal, this updating involving increasing the jitter signal value for each stuff detected while effecting a decrease in value at an average rate dependent on the value of the stuffing ratio.

* * * * *

UNITED STATES PATENT AND TRADEMARK OFFICE
CERTIFICATE OF CORRECTION

PATENT NO. : 4,757,452

DATED : Jul. 12, 1988

INVENTOR(S) : Peter M. Scott; William McFarlane

It is certified that error appears in the above-identified patent and that said Letters Patent is hereby corrected as shown below:

Column 2, line 66, "apparsatus" should read -- apparatus --

Column 6, line 23, "Q-P" please insert (1) at the right hand margin
should read -- $J_1 = J_0 + Q - P$ (1) --

Column 6, line 53, Please insert (2) at the right hand side
should read -- $J_1 = J_0 + X - S$ (2) --

Column 11, line 62, "exceded" should read -- exceeded --

Column 16, line 37, "MN" should read -- $M \neq N$ --

Signed and Sealed this

Twelfth Day of March, 1991

Attest:

HARRY F. MANBECK, JR.

*Attesting Officer*   *Commissioner of Patents and Trademarks*